United States Patent [19]

Hulland

[11] Patent Number: 5,027,121

[45] Date of Patent: Jun. 25, 1991

[54] VIDEO PROCESSOR FOR A COUNTER-COUNTERMEASURE SYSTEM

[75] Inventor: Burton L. Hulland, Glenwood Landing, N.Y.

[73] Assignee: The United States of America as represented by the Secretary of the Navy, Washington, D.C.

[21] Appl. No.: 743,536

[22] Filed: Jul. 9, 1968

[51] Int. Cl.$^5$ .............................................. G01S 7/36
[52] U.S. Cl. ...................................................... 342/16
[58] Field of Search .................. 343/18, 18 E; 342/16

Primary Examiner—Gilberto Barrön, Jr.

Attorney, Agent, or Firm—James V. Tura; James B. Bechtel; Susan E. Verona

[57] ABSTRACT

There is disclosed a video processor, for use in a counter-countermeasure system, to convert radar video signals into binary information, consisting of four parallel channels, the outputs of which are ORed to obtain a combined synthetic video signal. Two channels operate on video from a logarithmic detector to optimize sensitivity in the presence of jamming and to extract real target information. The third and fourth channels operate from the output of a wide band detector and can distinguish between swept noise pulses and true target signals.

7 Claims, 2 Drawing Sheets

VIDEO PROCESSOR FOR A COUNTER-COUNTERMEASURE SYSTEM

STATEMENT OF GOVERNMENT INTEREST

The invention defined herein may be manufactured and used by or for the Government of the United States of America for Governmental purposes without the payment of any royalties thereon or therefor.

BACKGROUND OF THE INVENTION

1. Field of the Invention

The present invention relates to a counter-countermeasure device and, more particularly, to a video processor used in such device to distinguish between a target and a jamming signal.

2. Description of the Prior Art

The purpose of a video processor is to convert radar video signals into binary information which represents those video pulses which resemble real targets. There are a number of characteristics that can be used to help identify true target signals from jamming signals. These include the length of a pulse, both at the base threshold and at a level near the peak amplitude of the pulse, the difference in these pulse lengths in channels with different IF bandwidths, the relative level of video at different times, and the rate of change of the video signal. In the field of counter-countermeasures systems, it has been the general practice to employ video processors that are capable of using only one of the above-identified pulse characteristics. Although such devices have served the purpose, they have not proved entirely satisfactory under all conditions of service for the reason that considerable difficulty has been experienced in differentiating between a true target signal and sophisticated jamming signals.

SUMMARY OF THE INVENTION

The video processor of the instant invention makes use of all the target characteristics by providing a number of channels in which detection of these various features are combined in different ways. As a result, this equipment approaches the theoretical performance limit in extraction of target video from most forms of jamming. The processor consists of four parallel channels, the outputs of which are ORed to obtain a combined synthetic video signal. One pair of these channels operates on video from a logarithmic detector having an IF band-pass filter connected thereto. One of the channels in this pair is designed specifically to optimize sensitivity in the presence of continuous thermal noise jamming. This channel uses a matched video filter to optimize signal-to-noise ratio and a simple amplitude threshold pulse zero crossing detector operating from the slope of the matched filter video output to identify the center of the received pulse. The second is a basic channel which extracts target information in most jammed and non-jammed environments. This general channel employs wide pulse discrimination before quantizing and short pulse discrimination (i.e., rejection of any pulses shorter than preset value). The second pair of channels of the video processor operates from the output of a wide band logarithmic detector. One channel is intended to provide information on targets in the presence of high-rate swept jamming, and consists of a simple amplitude threshold followed by a short pulse discriminator. Because of the difference in bandwidths, a swept continuous wave type jammer cannot provide the correct pulse widths in both the general purpose channel and this latter channel simultaneously. Thus, one or the other of these channels can be expected to detect the target and reject the jamming with a substantial degree of sub-jamming visibility in nearly all swept CW environments. However, it is possible for swept noise to simulate the right pulse width in both of these channels. To handle this case, the second channel of this pair is provided. This channel effectively measures the degree of signal amplitude fluctuation during a pulse to distinguish between swept noise pulses and true target signals.

Each of these four channels is provided with an automatic false alarm rate control loop which varies the threshold of the circuit quantizer to maintain the particular false alarm rate desired out of that channel. Thus, if a jammer succeeds in providing jamming pulses which are detected by any given channel, the threshold of that channel will automatically be raised to the point where such pulses are rejected, although stronger target pulses may still be detected. This prevents the false alarm rate from becoming excessive under any jamming environment, while at the same time, any channel which is able to detect the target will be allowed to do so.

Accordingly, it is an object of the present invention to provide a video processor for a counter-countermeasures system capable of detecting targets in the presence of noise.

Another object of the present invention is to provide a video processor utilizing target pulse length, both at the base threshold and at the peak amplitude of the pulse, as well as being able to sample these pulse lengths in channels having different IF band widths.

A further object of the present invention is the provision of a video processor that is able to distinguish between targets and jamming having different levels of video at different times.

Still another object of the present invention is to provide a video processor in a counter-countermeasures system whose performance approaches the theoretical performance limit in extraction of target video from most forms of jamming.

Other objects, advantages and novel features of the present invention will become apparent from the following detailed description of the invention when considered in conjunction with the accompanying drawings.

DESCRIPTION OF THE PREFERRED EMBODIMENTS

Figure 1:
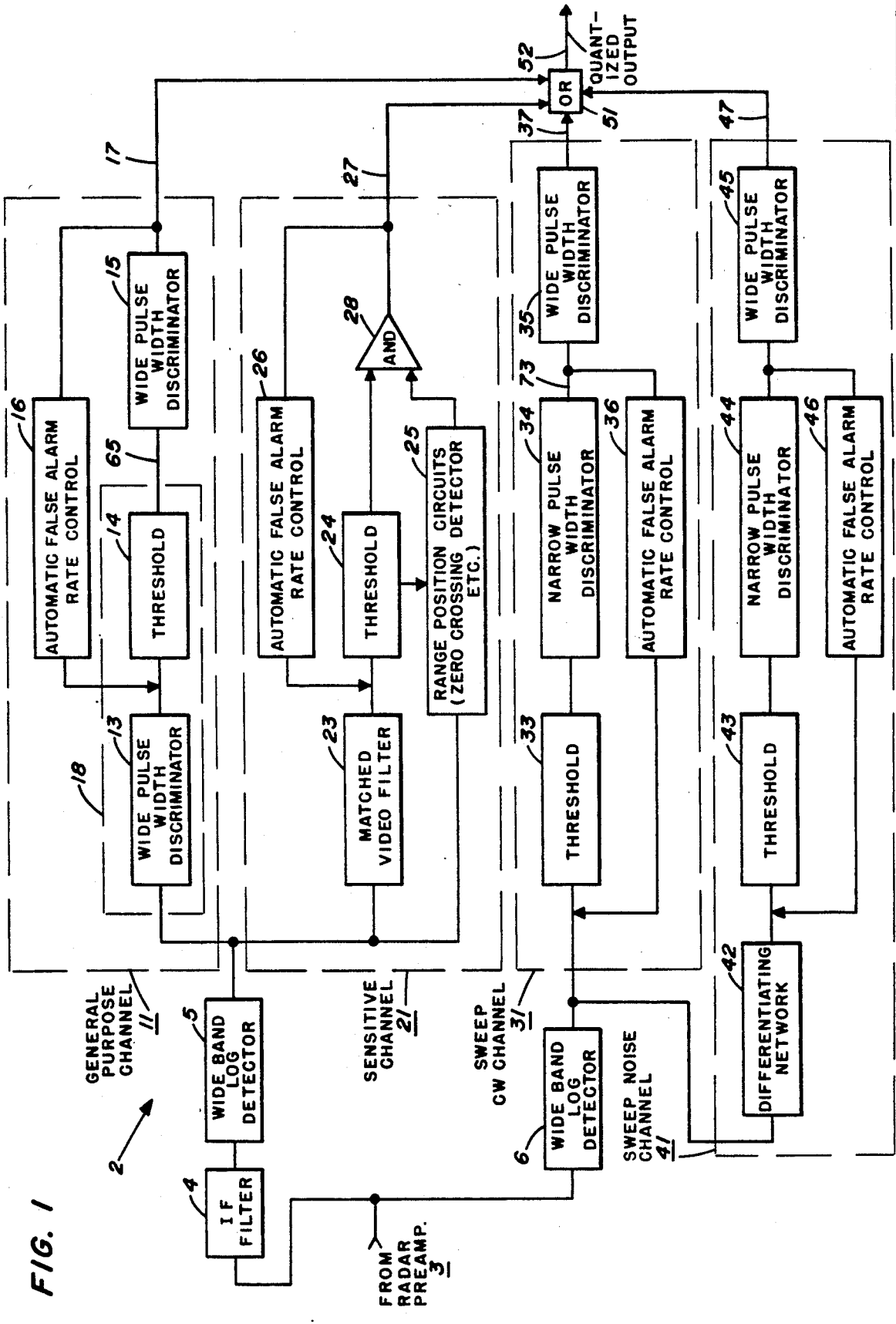
FIG. 1 shows a block diagram, the preferred embodiment of the invention.

Referring now to the drawings, wherein like reference characters designate like or corresponding parts throughout the several views, there is shown in FIG. 1, which illustrates the preferred embodiment, a video processor 2 having an input from the radar 3 connected to an IF filter 4 and a log detector 5 in parallel with a wide band log detector 6. Log detector 5 is electrically connected to two channels, the general purpose channel 11 and the sensitive channel 21. Wide band log detector 6 is connected in series with a parallel pair of channels, swept continuous wave channel 31 and swept noise channel 41. The outputs of the four channels, 17, 27, 37 and 47, respectively, are connected to OR gate 51 which yields a quantized output 52 representative of the true target signal.

Referring, in more detail, to the channels, general purpose channel 11 is designed to extract target information in most jammed and non-jammed environments. It is limited in its capabilities to provide good detection sensitivity for weak target returns and in its capability to reject CW (continuous wave) jamming and very high frequency swept CW or swept noise jamming. This channel compares video amplitudes one pulse width before and one pulse width after the point being examined as well as the slope of the video at the point being examined. It also employs short pulse discrimination and has the capability of rejecting narrow jamming pulses even though they may have been stretched to equal the radar pulse width.

Figure 2:
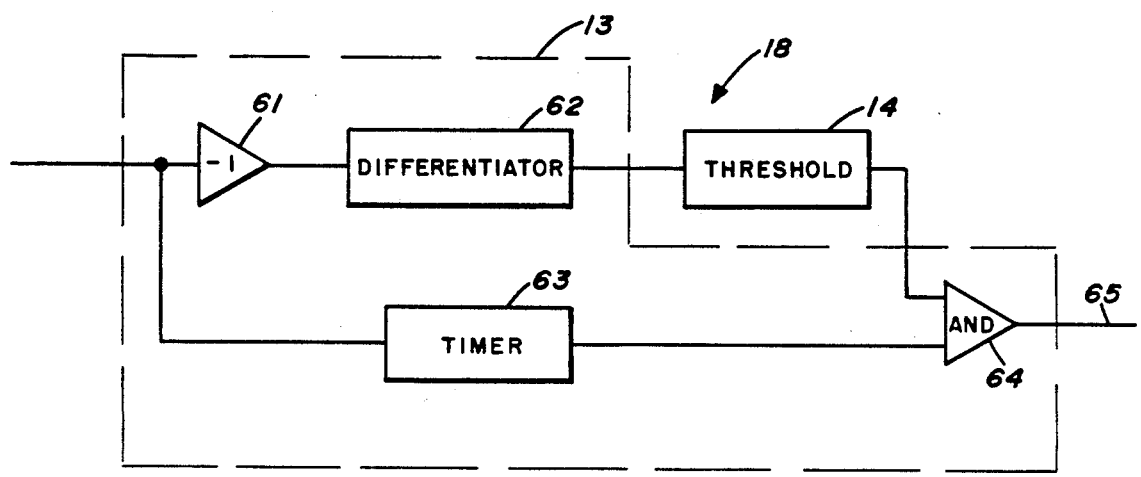
FIG. 2 is a block diagram representative of the wide pulse discriminator of FIG. 1.

The IF video from log detector 5 is used as the input for the general channel 11. This video is passed through wide pulse width discriminator 13 and threshold detector 14. The wide pulse discriminator, more fully shown in FIG. 2, compares the instantaneous video amplitude with the amplitudes one pulse width earlier and one pulse width later. A video signal will pass the threshold detector 14 only when it is significantly greater than the signals occurring a pulse width earlier and a pulse width later. The fact that this wide pulse discriminator measures the pulse width with respect to the peak amplitude of the pulse rather than at the base of the pulse (that is, just above the receiver noise level) means that this circuit will not reject a strong bona fide target return, which can be much wider at its base than the radar's transmitted pulse width. The output of the threshold circuit 14 consists of quantized video pulses. When these are the result of a normal target return they will have the correct pulse width.

Referring now to FIG. 2, wide pulse width threshold discriminator 18 is composed of wide pulse width discriminator 13 in series with threshold circuit 14. Discriminator 13 consists of operational amplifier 61 in series with differentiator 62, the output of which is electrically connected through threshold circuit 14 to one input of AND gate 64. When an input pulse is applied to wide pulse discriminator 13, a timer 63 is activated that releases a pulse that is delayed by the width of the widest pulse that is to be passed. The output of the timer is applied as a blanking input to AND circuit 64. The differentiator 62 is arranged to have an output only at the termination of the quantized pulse. There will only be an output from the AND circuit if the pulse width is left in the time taken for the timer to run out.

Returning to FIG. 1, the output of log detector 5 is differentiated by differentiator 62 of wide pulse width discriminator 13 during the interval when a pulse signal is decaying in IF filter 4, the log video will be dropping, and the output of differentiator 62 will be negative pulse. In other words, the presence of a negative signal at the output of the differentiator indicates that a target signal is no longer present in the receiver. This condition is sensed by the pulse width threshold circuit 18 which then gates off the synthetic target signal in AND gate 64 and reduces the synthetic video pulse width to its time value. When the pulse width of the synthetic video is restored to the correct value, strong narrow jamming pulses that had been stretched to the nominal radar pulse width by IF filter 4 and log detector 5 are fed to narrow pulse discriminator 15 to remove any narrow noise or jamming pulses.

The rate of occurance of output signals from the general channel is compared with the desired signal-hit false alarm rate in the automatic false alarm rate circuitry 16, and the difference is fed back to threshold circuit 14 to maintain the output false alarm rate at the desired preset value.

All channels of the video processor maintain a constant false alarm rate that is controlled by its respective circuitry that samples the quantized output of the threshold detector and generates a threshold voltage proportional to the output of the false alarm rate. The general purpose channel 11 utilizes automatic false alarm rate control 16 while sensitive channel 21 has automatic false alarm rate control 26. The remaining channels have their associated automatic false alarm rate control circuits as well. As in all feedback control systems, the error signal is amplified so that the controlled output is related to the reference input and is not affected by changes in system parameters such as gain, etc. Associated with any particular video input level is a threshold level that yields a desired false alarm rate. If the video level changes due to jamming situations or receiver gain changes, a different threshold level will be required to maintain the same false alarm rate. Since the threshold level is directly related to the difference between the fixed reference voltage and a voltage directly proportional to the false alarm rate, the false alarm rate must change slightly to produce the new threshold setting. The change can be kept small by using a high gain control loop.

The sensitive channel 21 uses a matched video filter 23 to enhance the signal-to-noise ratio and a simple amplitude threshold circuit 24 and a zero crossing detector 25 to identify the center of the received pulse. This channel is designed specifically to optimize sensitivity in the presence of receiver noise or any continuous type of jamming (such as noise, barrage or CW jamming). The input to this channel is taken from the output of IF filter 4 and log detector channel 5. The output signal from log detector 5 is passed through matched video filter 23, which may be comprised of a delay line differentiator followed by an integrator. The output of the filter is applied to threshold detector 24 where it is quantized for further processing. One output of threshold detector 24 is applied to range position circuit 25 that defines the position, in time, of the quantized target signal to prevent excessive range jitter due to fluctuating targets. This is done by referencing the range position of the quantized video signal to the position at which the video signal is a maximum. The output of threshold 24 and range position 25 is then fed to AND gate 28. The output of AND gate 28 is then independent of target signal strength since one input to this AND gate always begins at the time of the peak target signal and the other input always ends at a delayed rate later.

The rate of occurance of output signals from the sensitive channel is compared with the desired signal-hit false alarm rate in the automatic false alarm rate circuitry 26, and the difference is fed back to threshold circuit 24 to maintain the output false alarm rate at the desired preset value. This is identical to automatic false alarm rate control 16 utilized in general channel 11.

The swept continuous wave channel 31 has been specifically designed to detect targets with optimum sensitivity in the presence of swept CW jamming. Since the impulse response of this channel is quite short, narrow jamming pulses are rejected by narrow pulse discriminator 34.

The input to channel 31 is the output of the wide band log detector 6. The wide band video signals are passed through a threshold detector 33 and then through narrow pulse discriminator 34, more fully shown in FIG. 3, where narrow jamming pulses and noise pulses are removed. The output of the narrow pulse discriminator is then sent to automatic false alarm rate circuitry 36 which adjusts the threshold level to maintain the false alarm rate at the proper preset value. In a swept CW environment, the threshold setting will be maintained in the vicinity of the receiver noise level since narrow jamming pulses are removed from the quantized video input that controls the threshold setting. The output of the narrow pulse discriminator 34 passes through a wide pulse discriminator 35 to prevent wide pulses from contaminating the combined output of the video processor. Wide pulse width discriminator 35 is similar in structure to wide pulse width discriminator 13 used in channel 11 and shown in FIG. 2, however, differentiator 62 would go directly to one input of AND gate 64 thereby eliminating threshold circuit 14.

Figure 3:
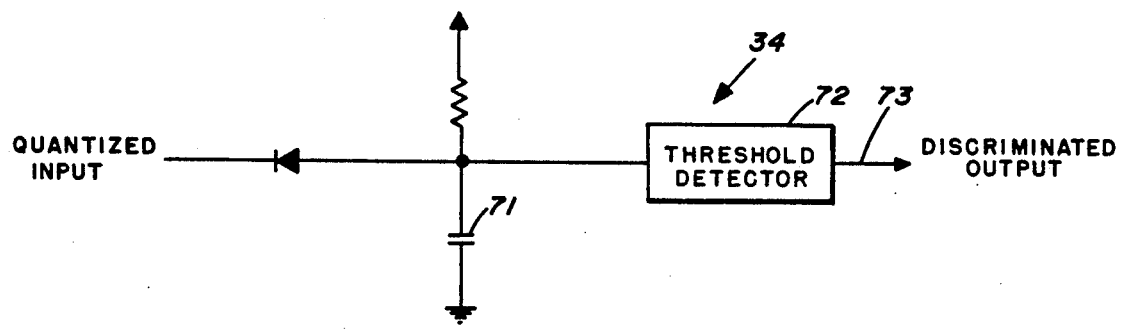
FIG. 3 is a block diagram representative of the narrow pulse discriminator of FIG. 1.

The narrow pulse discriminator 34, shown in FIG. 3, operates on the principle that the peak voltage that capacitor 71 charges to occurs at the end of the applied pulse, from threshold circuit 33, assuming that the time constant of the changing circuit is large compared to the width of the applied pulse. There will be an output from threshold detector 72 only when the quantized input pulse is long enough. This output is then fed to wide pulse width discriminator 35 and the output of which is fed to OR circuit 51. The narrow pulse width discriminator shown in FIG. 3 is identical to elements 15 and 44 in FIG. 1.

Swept noise channel 41 is designed to handle swept continuous wave jamming that is amplitude modulated by wide band noise. Since it is possible for a swept noise jammer to simulate the critical dwell time in both the swept continuous wave channel and general channel simultaneously, the swept noise channel is included in this video processor to provide subjamming visability during this form of jamming. This channel operates on the principle of detecting the suppression of noise in the logarithmic detector by a real target to distinguish it from the relatively noisy video of a swept noise jammer.

The input to the swept noise channel 41 is derived from the output of wide band log detector 6. The video output of the wide band log detector is first differentiated by a short time constant circuit 42 to remove the DC component from the pulse being measured. The output of the differentiating network is then applied to threshold network 43 where the video information is quantized. If the threshold level is set in the middle of the noise (instead of just above it), in the case of swept noise jamming, several threshold crossings will take place during the time the swept noise pulse is present, and the pulse will be broken up into several narrow pulses. These will subsequently be rejected by narrow pulse width discriminator 44. Narrow pulse width discriminator 44 is identical to narrow pulse width discriminator 34 shown in FIG. 3. In the case of a true target signal having a high signal-to-noise ratio, the noise will be suppressed over the pulse width of the target return, and the output of threshold circuit 43 will be a clean pulse of the proper width which will be passed by narrow pulse discriminator 44 while narrow jamming pulses and noise pulses will be removed. The output of narrow pulse discriminator 44 is then sent to automatic false alarm rate circuitry 46 to maintain the false alarm rate at the proper preset value. The output of the narrow pulse discriminator passes through a wide pulse discriminator 45 to prevent wide pulses from contaminating the combined output of the video processor. This output is then sent to OR gate 51.

The operation of the video processor will be described in relation to its operation as against continuous wave jamming and as against swept noise jamming. Swept continuous wave jamming can be highly effective in two different ways. If the jamming dwell time (or the time the jammer takes to sweep through the radar receiver IF bandpass) is equal to the radar pulse width, it is extremely difficult to distinguish a jamming pulse from a target pulse. Secondly, when the jamming sweep rate is very high, so that the time between jamming sweeps is less than the transient recovery time of the IF filter and log detector, the jamming is effectively always within the receiver bandpass and acts like noise or continuous wave to obscure or suppress the target signal.

The video processor utilizes two channels with different IF bandwidths (this is accomplished by inserting IF filter 4 in one channel) to discriminate against swept CW jamming. Since two IF bandwidths are employed, a swept CW type jammer cannot match the radar pulse width in both channels simultaneously. Consequently, the pulse width discriminators in one or the other of these channels can be expected to reject the jamming pulses. As a result, the target will be detected with a substantial degree of subjamming visibility in nearly all swept CW environments. Depending on the jamming band width, the target will either appear as an output from the general purpose channel 11 or from the swept CW channel 31 while the jamming signal will be rejected. The general channel 11 has excellent subjamming visability in the region of sweep frequencies where the dwell time effects decrease the detection sensitivity of the swept CW channel 31. Therefore, when the outputs of these two channels are summed together by OR gate 51, there is not an excessive loss of subjamming visability.

The swept noise channel 41 was designed to handle a type of swept CW jamming that is amplitude modulated by wide band noise. A technique of processing valid targets in a swept CW environment is based on the fact that a given sweep slope cannot create a pulse of the correct width in two channels with different IF bandwidths simultaneously. Therefore, good jamming rejection and target detection can be maintained by combining the outputs of a narrow band and wide band channel, 41 and 11, respectively.

Sensitive channel 21 is utilized to filter out all gaussian noise type jamming. For a given pulse or target return only a matched IF filter will yield the greatest signal-to-noise ratio. This type of filter is not usually employed because of construction difficulties. There is, therefore, a loss in signal-to-noise ratio compared to the largest signal-to-noise ratio attainable with a matched IF filter. This loss is substantially overcome by also utilizing a matched video filter, such as matched video filter 23 in the sensitive channel. IF filter 4 with a two-pole response having a band width of 1.5 mc drives a logarithmic detector whose output is sent to the matched video filter 23. The output of the matched video filter is then further processed by a threshold detector 24 as previously explained. Experimental measurements indicated that the matched video filter effectively improved the signal-to-noise ratio and was therefore able to detect targets in the presence of gaussian noise. By combining the effects of all four channels in the video processor all known methods of jamming can be eliminated and the real target detected.

Obviously many modifications and variations of the present invention are possible in the light of the above teaching. It is therefore to be understood that within the scope of the appended claims, the invention may be practiced otherwise than as specifically described.

What is claimed is:

1. A video processor for use in a radar counter-countermeasure system to distinguish between target signals and jamming signals comprising
    an input means from said radar wherein target signals and jamming signals are provided;
    four channel means connected in parallel to said input means to discriminate between a target signal and a jamming signal wherein a quantized output is produced in any of said channel means when a target signal is present;
    said first channel means being operable to produce a quantized output signal when a target signal is present by utilizing wide pulse discrimination and narrow pulse discrimination;
    said second channel means being operable to optimize sensitivity in the presence of continuous thermal noise jamming by the identification of the center of a received signal pulse and produce a quantized output signal when a target signal is present;
    said third channel means being operable to provide a quantized output signal in the presence of high rate CW swept jamming by utilizing short pulse discrimination;
    said fourth channel means being operable to provide a quantized output signal in the presence of swept noise jamming by measuring the degree of amplitude fluctuation of a pulse; and
    output means connected to said four channel means to provide a quantized output whenever a target signal is present in any of said four channel means.

2. A video processor as in claim 1 wherein
    said input means comprises a first electrical circuit means to said first and second channel means and a second electrical circuit means to said third and fourth channel means;
    said first electrical circuit means comprises an IF filter connected in series with a wide band log detector; and
    said second circuit means comprises a wide band log detector.

3. A video processor as in claim 2 wherein
    said first channel means comprises a wide pulse width threshold discriminating means connected to said first electrical circuit means wherein all jamming signals that are wider than a true target signal are blocked and wherein all other signals produce a quantized output signal; and
    a first narrow pulse width discriminating means in series with said pulse width threshold discriminating means wherein all quantized signals that are narrower than a true target signal are blocked.

4. A video processor as in claim 3 wherein
    said second channel means comprises a matched video filter connected to said first circuit means wherein signal to noise ratio is optimized; and
    an amplitude threshold pulse zero crossing detector means connected in series to said video filter wherein the output of said zero crossing detector represents the center of any signal pulse applied to said second channel means.

5. A video processor as in claim 4 wherein
    said third channel means comprises a first narrow pulse width threshold circuit discriminating means connected in series with said second electrical circuit means; and
    a first wide pulse width discriminating means connected in series to said first narrow pulse width threshold circuit discriminating means wherein all CW type jamming signals are either blocked by said third channel means or said first channel means.

6. A video processor as in claim 5 wherein
    said fourth channel means comprises a differentiating means connected in series with said second electrical circuit means;
    a second narrow pulse width threshold circuit discriminating means connected in series with said differentiating means; and
    a second wide pulse width discriminating means connected in series to said second narrow pulse width threshold circuit discriminating means wherein amplitude signal fluctuation is measured to distinguish between a swept noise jamming signal and a true target signal.

7. The video processor as in claim 6 wherein
    an automatic threshold false alarm control means is electrically associated with each of said channel means to vary the threshold level of said channel to maintain a particular false alarm rate.

* * * * *